United States Patent Office

3,160,650
Patented Dec. 8, 1964

3,160,650
PROCESS FOR MAKING 1-CYCLOHEXENYL PHOSPHONIC ACID DIESTERS AND AN INTERMEDIATE COMPOUND FOR USE THEREIN
Gail H. Birum and George A. Richardson, Dayton, Ohio, assignors to Monsanto Company, a corporation of Delaware
No Drawing. Filed Dec. 30, 1960, Ser. No. 79,512
13 Claims. (Cl. 260—461)

This invention relates to organic phosphorus compounds. More particularly, this invention is directed to a process for preparing a mixture of phosphonate esters, at least some of which are new compounds, and the use of said compounds and mixtures thereof.

One object of this invention is to provide novel phosphonate ester compounds. It is a further object of this invention to provide an economically attractive process for preparing certain phosphonate esters. Another object of this invention is to provide novel hydrocarbon fuel additive compositions. Still another object of this invention is to provide an improved hydrocarbon fuel composition containing a preignition-inhibiting agent and an organic halide scavenger, which agent and scavenger are prepared in one economical process. Other objects, advantages, and embodiments of this invention will be apparent from a consideration of the accompanying disclosure and the appended claims.

In general, it has been discovered according to this invention that new phosphonate ester compounds may be prepared in an economically advantageous manner by thermally cleaving certain complex phosphite-phosphonate esters which have a specific type of internal structural relationship. The thermally cleaved product of the reaction is a mixture of two specific types of phosphonate esters which may be used as such for certain purposes, e.g., as a hydrocarbon fuel preignition-inhibiting additive composition, or may be separated into its individual compound components.

More specifically, it has been discovered according to this invention, that new phosphonate esters can be prepared by thermally cleaving a complex phosphite-phosphonate ester of the formula $$(X-\underset{R'}{\underset{|}{C}}-\underset{R''}{\underset{|}{C}}HO)_2POC\underset{CH_2}{\overset{O}{\underset{\diagdown}{\overset{\|}{P}}}}\underset{CH_2}{\overset{R''}{\diagup}}(O\underset{R'}{\underset{|}{C}}H-\underset{R}{\underset{|}{C}}-X)_2$$
$$\underset{CH_2}{\diagup}\underset{CH_2}{\diagdown}$$

wherein X is an electronegative substituent, i.e., an electron withdrawing substituent, selected from the group consisting of bromine, chlorine, fluorine, the cyano radical, and the phenyl radical; R is selected from the group consisting of hydrogen, bromine, chlorine, fluorine, and hydrocarbyl and hydrocarbyloxyalkyl radicals having from 1 to 6 carbon atoms, and chlorine and bromine derivatives thereof; and R' is selected from the group consisting of hydrogen, bromine, chlorine, and fluorine, provided that when X is the cyano radical, R is selected from the group consisting of hydrogen and alkyl radicals having from 1 to 6 carbon atoms, and R' is hydrogen; and R" is selected from the group consisting of hydrogen and the methyl radical. It can thus be seen that all three of X, R, and R' may be halogens, or that electron withdrawing groups other than halogens can be used, e.g., the cyano group.

When a complex phosphite-phosphonate of the above-defined type is subjected to thermal action of sufficient intensity to cause a cleavage reaction, there is obtained as product therefrom, a mixture of two phosphonate esters, one from each of the classes illustrated by the following general formulas:

(A) a compound of the general formula $$(X-\underset{R'}{\underset{|}{C}}-\underset{R''}{\underset{|}{C}}HO)_2\overset{O}{\underset{\|}{P}}H$$

and (B) a compound of the general formula $$(X-\underset{R'}{\underset{|}{C}}-\underset{R''}{\underset{|}{C}}HO)_2\overset{O}{\underset{\|}{P}}-C\underset{CH_2-CH_2}{\overset{CH-CH_2}{\diagup}}\overset{}{\underset{\diagdown}{\diagdown}}CH_2$$

wherein X, R, R' and R" are as defined above. Compounds of type (A) above can be generally named as bis-(β-substituted alkyl) phosphonate esters, e.g., bis(2-chloroethyl) phosphonate, and bis(2-phenylethyl) phosphonate, while compounds of type (B) can be named generally as bis(β-substituted alkyl) 1-cyclohexenylphosphonates, e.g., bis(2-cyanopropyl) 1-cyclohexenylphosphonate, and bis(2-chloroethyl) 1-cyclohexenylphosphonate.

The complex phosphite-phosphonate esters used in the process of this invention and defined above may be prepared by reacting cyclohexanone with a mixture of a phosphorochloridite or phosphorobromidite of the general formula $$(X-\underset{R'}{\underset{|}{C}}-\underset{R''}{\underset{|}{C}}HO)_2P-Y$$

wherein X, R, R' and R" are as defined above, and Y is selected from the group consisting of bromine and chlorine, and a triorgano phosphite of the general formula $$(X-\underset{R'}{\underset{|}{C}}-\underset{R''}{\underset{|}{C}}HO)_3P$$

wherein X, R, R' and R" are as defined above. The reaction results in the formation of a complex phosphite-phosphonate ester and a halogenated organic by-product.

Thus, applicants have discovered a unique process illustrated by the following general equations:

(1)
$$(X-\underset{R'}{\underset{|}{C}}-\underset{R''}{\underset{|}{C}}HO)_2P-Y + \underset{CH_2}{\overset{\overset{O}{\underset{\|}{C}}}{\diagup}}\underset{CH_2}{\overset{CH_2}{\diagdown}}CH_2 + P(O\underset{R'}{\underset{|}{C}}H-\underset{R}{\underset{|}{C}}-X)_3 \longrightarrow$$

$$\left[ (X-\underset{R'}{\underset{|}{C}}-\underset{R''}{\underset{|}{C}}HO)_2POC\underset{CH_2}{\overset{O}{\underset{\diagdown}{\overset{\|}{P}}}}\underset{CH_2}{\overset{R''}{\diagup}}(O\underset{R'}{\underset{|}{C}}H-\underset{R}{\underset{|}{C}}-X)_2 \right] + X-\underset{R'}{\underset{|}{C}}-\underset{R''}{\underset{|}{C}}H-Y$$

(2)
$$\left[ (X-\underset{R'}{\underset{|}{C}}-\underset{R''}{\underset{|}{C}}HO)_2POC\underset{CH_2}{\overset{O}{\underset{\diagdown}{\overset{\|}{P}}}}\underset{CH_2}{\overset{R''}{\diagup}}(O\underset{R'}{\underset{|}{C}}H-\underset{R}{\underset{|}{C}}-X)_2 \right] \xrightarrow{\Delta \text{ (heat)}}$$

$$(X-\underset{R'}{\underset{|}{C}}-\underset{R''}{\underset{|}{C}}HO)_2\overset{O}{\underset{\|}{P}}H + (X-\underset{R'}{\underset{|}{C}}-\underset{R''}{\underset{|}{C}}HO)_2\overset{}{P}-C\underset{CH_2-CH_2}{\overset{CH_2-CH_2}{\diagup}}\overset{}{\underset{\diagdown}{\diagdown}}CH_2$$

wherein X, R, R', R", and Y are as defined above. In the above equations, the compound within the brackets [ ] is the complex phosphite-phosphonate from which compounds of types (A) and (B) above are derived.

The use of the particular type of reactants, indicated above, in the process of this invention is critical in two respects. To prepare compounds of types (A) and (B), above, according to the process of this invention, it is necessary that cyclohexanone be used in Reaction 1, and that each of the phosphorohalidite and phosphite reactants have electronegative or electron-withdrawing substituents in the beta position of the ester radicals. Applicants have discovered, somewhat surprisingly, that the cleavage reaction of this invention cannot be accomplished satisfactorily when other ketones are used in preparing the phosphite-phosphonate intermediates.

The temperature at which thermal rearrangement of the complex phosphite-phosphonate ester takes place depends upon the nature of the X and R substituents. In general, lower minimum thermal cleavage temperatures are characteristic of phosphite-phosphonates having the more strongly electronegative substituents in the beta position of the ester groups. In some cases where the beta position substituents are strongly electronegative, this thermal cleavage reaction may occur at room temperature or below, i.e., almost as soon as the phosphite-phosphonate material has been formed. Thus, for particular purposes, phosphonate esters can be prepared by the process of this invention at relatively low temperatures requiring little or no applied external heat source by suitable selection of starting materials which have strong electronegative substituents in the β-position. In some cases, the exothermic heat of reaction given off in the formation of the phosphite-phosphonate complex ester will be, of itself, sufficient to initiate the cleavage reaction according to this invention. However, in most cases, it is preferred to first prepare the complex phosphite-phosphonate at low temperatures, and then slowly raise the temperature to a previously determined optimum temperature to effect the cleavage reaction. Generally, temperatures on the order of from 20° C. to 150° C. are sufficient to effect the cleavage reaction, with the lower temperatures being more suitable for the more strongly electronegatively substituted starting materials. Regardless of what specific temperature the cleavage reaction takes place, it is usually preferred to warm the reaction mixture at from 60° C. to 150° C. for from 0.75 to 2 hours to insure complete reaction and to accomplish the reaction in an efficient time period.

When the thermally induced cleavage reaction is completed, the product, which contains a mixture of the two types of phosphonate esters described above, may be treated according to conventional techniques to separate the individual compounds therefrom. Among such techniques are included fractional distillation, solvent extraction, crystallization, chromatography, etc.

A particularly advantageous method for preparing phosphite-phosphonate compounds useful in the process of this invention consists of first contacting substantially five moles of an appropriate oxirane compound with substantially two moles of phosphorus trichloride or phosphorus tribromide to obtain a substantially equimolar mixture of a chlorine- or bromine-substituted triorgano phosphite and a chlorine- or bromine-substituted diorgano phosphorochloridite or -bromidite, and then contacting said mixture with cyclohexanone to obtain as product a 1 - [bis(halohydrocarbyloxy)phosphinyl]cyclohexyl bis(halohydrocarbyl) phosphite admixed with a halohydrocarbon by-product.

Oxirane compounds suitable for reaction with the phosphorus trichloride or phosphorus tribromide to yield the equimolar mixtures of phosphite and phosphorochloridite or phosphorobromidite are those having the epoxy group in the 1,2-position, e.g., ethylene oxide and the alkyl derivatives thereof such as propylene oxide, isobutylene oxide, 1,2-epoxybutane, 1,2-epoxypentane, 1,2-epoxyhexane, 1,2-epoxyheptane, 1,2-epoxy-4-methylpentane, 1,2-epoxy-2-ethylhexane, 1,2-epoxy - 2,4,4 - trimethylpentane, 1,2-epoxy-2,3-dimethylheptane; haloalkyl-substituted oxiranes such as epichlorohydrin, epibromohydrin, epifluorohydrin, 1,2-epoxy-4-bromobutane, 1,2-epoxy-3,4-dibromobutane, 1,2-epoxy-4-bromopentane, 1,2-epoxy-3,3,3 - trifluoropropane; the alkenyl substituted oxiranes such as 1,2-epoxy-3-butene, and 1,2-epoxy-4-hexene; aryl-substituted oxiranes such as (epoxy-ethyl)benzene, (1,2-epoxy-1-methylethyl)benzene, (3-chloro-1,2-epoxypropyl)benzene and (1,2 - epoxypropyl)benzene; alkoxyalkyl- and phenoxyalkyl-substituted oxiranes such as the methyl, ethyl, isopropyl, isoamyl and phenyl ethers of glycidol, i.e., compounds of the formula

wherein R is methyl, ethyl, isopropyl, amyl or phenyl; and (2-ethoxyethyl)ethylene oxide, etc.

Reaction of two moles of phosphorus trichloride or of phosphorus tribromide with 5 moles of the presently substituted oxiranes gives, by way of example, substantially equimolar mixtures of the following phosphites and phosphorohalidites:

(I) Tris(2-chloroethyl) phosphite and bis(2-chloroethyl) phosphorochloridite,
(II) Tris(2,3-dichloropropyl) phosphite and bis(2,3-dichloropropyl) phosphorochloridite,
(III) Tris(2-chloropropyl) phosphite and bis(2-chloropropyl) phosphorochloridite,
(IV) Tris(2-bromoethyl) phosphite and bis(2-bromoethyl) phosphorobromidite,
(V) Tris(2-bromopropyl) phosphite and bis(2-bromopropyl) phosphorobromidite,
(VI) Tris(2,3-dibromopropyl)phosphite and bis(2,3-dibromopropyl) phosphorobromidite,
(VII) Tris(2-bromo-3-chloropropyl) phosphite and bis(2-bromo-3-chloropropyl) phosphorochloridite,
(VIII) Tris(3-bromo-2-chloropropyl) phosphite and bis(3-bromo-2-chloropropyl) phosphorobromidite,
(IX) Tris(2-chlorobutyl) phosphite and bis(2-chlorobutyl) phosphorochloridite
(X) Tris(2-bromobutyl) phosphite and bis(2-bromobutyl) phosphorobromidite,
(XI) Tris(2-chloro-1-methylpropyl) phosphite and bis(2-chloro-1-methylpropyl) phosphorochloridite,
(XII) Tris(2-chloro-2-phenylethyl) phosphite and bis(2-chloro-2-phenylethyl) phosphorochloridite,
(XIII) Tris(2-chloro-3-butenyl)phosphite and bis(2-chloro-3-butenyl) phosphorochloridite,
(XIV) Tris(2-chloro-2-ethylhexyl) phosphite and bis(2-chloro-2-ethylhexyl) phosphorochloridite,
(XV) Tris(2-methoxy-2-chloropropyl) phosphite and bis(3-methoxy-2-chloropropyl) phosphorochloridite,
(XVI) Tris(3-phenoxy-2-bromopropyl) phosphite and bis(3-phenoxy-2-bromopropyl) phosphorochloridite,
(XVII) Tris(2-chloro-4-ethoxybutyl) phosphite and bis(2-chloro-4-ethoxybutyl) phosphorochloridite,
(XVIII) Tris(3-fluoro-2-chloropropyl) phosphite and bis(3-fluoro-2-chloropropyl) phosphorochloridite
(XIX) Tris(2-phenyl-2-chloroethyl) phosphite and bis(2-phenyl-2-chloroethyl) phosphorochloridite.

Since reaction of the oxirane compound with the phosphorus trihalide proceeds through opening of the oxirane ring, there may be present in the above mixtures minor amounts of isomeric phosphite and isomeric phosphorohalidite, e.g., while in the reaction of phosphorus trichloride with propylene oxide the oxirane ring opens with preferential formation of tris(2-chloropropyl) phosphite and bis(2-chloropropyl)phosphorochloridite there may also be formed small quantities of tris(1-methyl-2-chloroethyl) phosphite and bis(1-methyl-2-chloroethyl) phosphorochloridite. The isomer content, if any, of the reaction mixture is of little consequence for the present purpose because in most cases the isomers also react with cyclohexanone to give phosphite-phosphonates which can be thermally rearranged according to the process of this invention. While the small quantity of isomeric phosphite-phosphonate present in the final reaction product may be considered to constitute an impurity, it is not detrimental in practical application, for the isomers are so closely related that they possess substantially the same utility. Thus, the content of, say a small quantity of the 1 - [bis(1-methyl-2-chloroethoxy)phosphinyl]cyclohexyl bis(1 - methyl - 2 - chloroethyl) phosphite in the 1-[bis(2-chloropropoxy)phosphinyl]cyclohexyl bis(2 - chloropropyl) phosphite, which may be present in the reaction product of cyclohexananone and the mixture of phosphite and phosphorochloridite obtained from two moles of phosphorus trichloride and five moles of propylene oxide, generally does not limit the utility of the latter for making phosphonate compounds of the present invention. However, if desired, the isomeric impurity may be separated by generally known isolating procedures, i.e., chromatography, crystallization, etc.

Reaction of the phosphorus trichloride or phosphorus tribromide with the presently useful oxirane compounds takes place readily, generally by simply mixing the phosphorus halide with the oxirane compound in the approximately 2:5 ratio. Depending on the nature of the individual reactants, heating may or may not be required. The addition of catalytic amounts of acids or halohydrin compounds, e.g., ethylene chlorohydrin, propylene chlorohydrin, may be beneficial. Usually the reaction is exothermic, whereby cooling in order to maintain smooth reaction is advantageous. It is recommended that in such exothermic reactions, the temperature be not allowed to rise above, say from 80–100° C. An inert diluent may or may not be employed. When no diluent is used and there has been employed two moles of the phosphorus halide with five moles of the oxirane compound, the product generally consists of the substantially equimolar mixture of the tris-haloörgano phosphite and bis-haloörgano phosphorohalidite. Hence no isolating procedure is required before reaction with the cyclohexanone for preparation of the phosphite-phosphonate ester. However, particularly in initial runs with a hitherto unemployed oxirane compound, it may be advantageous to heat the 2:5 phosphorus halide-oxirane reaction product under vacuum in order to remove any unreacted initial reactants prior to treatment with cyclohexanone. As will be appreciated by those skilled in the art, such a procedure is not at all necessary when optimum conditions for the individual oxirane compound have been determined, i.e., when the reaction has been carried to completion. Noting cessation of change in refractive index or of heat evolution in the case of exothermic reactions, or of change in viscosity of the reaction mass will suffice to determine when all of the initial reactants have been consumed.

To recapitulate, reaction of the phosphorohalidite, cyclohexanone, and phosphite reactants to prepare the phosphite-phosphonate complex ester occurs by mixing together the three reactants at ordinary, decreased, or increased temperatures and allowing the resulting reaction mixture to stand until formation of the desired phosphite-phosphonate. Generally, temperatures on the order of 0° C. to 150° C. are used with temperatures of 10° C. to 75° C. being preferred. Because the reaction is sometimes exothermic, gradual contact of the reactants is usually recommended. However, as will be apparent to those skilled in the art, the exothermal nature of the reaction becomes less of a factor as the molecular weight of the phosphorus reactants is increased.

In preparing the phosphite-phosphonate complex ester by reacting cyclohexanone with a phosphorochloridite or -bromidite ester and a phosphite ester of the above defined type, there is produced concurrently therewith a halogenated by-product. Thus, the reaction of, say, bis(2-chloroethyl)-phosphorochloridite and tris(2-chloroethyl) phosphite with cyclohexanone gives 1,2-dichloroethane as a by-product. These halogenated by-products may be separated, if desired, since they are articles of commerce for which many applications exist. However, it is not necessary to separate them prior to the thermally induced cleavage reaction of this invention since they do not hinder or otherwise interfere with that reaction. Oftentimes it may be desirable to leave the halogenated by-product admixed with the phosphonate products to enhance the value thereof, e.g., as a gasoline additive composition. Thus, while many currently employed processes for the manufacture of organic compounds of phosphorous entail substantial waste of halogen in that by-products of little commercial importance are formed, in the present process, all of the halogen constituent of the raw materials is converted to products of economic importance.

Examples of products of this invention and the complex phosphite-phosphonates from which they are obtained are:

Bis(2-bromoethyl) phosphonate and bis(2-bromoethyl) 1-cyclohexenylphosphonate obtained from 1-[bis(2-bromoethoxy)phosphinyl]cyclohexyl bis(2 - bromoethyl) phosphite, Bis(2-cyanohexyl) phosphonate and bis(2-cyanohexyl) 1-cyclohexenylphosphonate obtained from 1-[bis(2-cyanohexyloxy)phosphinyl]cyclohexyl bis(2-cyanohexyloxy) phosphite, Bis(2-chloro-3-octenyl) phosphonate and bis(2-chloro-3-octenyl) 1-cyclohexenylphosphonate obtained from 1-[bis(2-chloro-3-octenyloxy)phosphinyl]cyclohexyl bis (2-chloro-2-octenyl) phosphite, Bis(2-phenylethyl) phosphonate and bis(2-phenylethyl) 1-cyclohexenylphosphonate obtained from 1-[bis(2-phenylethoxy)phosphinyl]cyclohexyl bis(2 - phenylethyl) phosphite, Bis(2,2,2-trichloroethyl) phosphonate and bis(2,2,2-trichloroethyl) 1-cyclohexenylphosphonate obtained from 1 - [bis(2,2,2 - trichloroethoxy)phosphinyl]cyclohexyl bis(2,2,2-trichloroethyl) phosphite, Bis(2-bromo-2-ethoxyethyl) phosphonate and bis(2-bromo-2-ethoxyethyl) 1-cyclohexenylphosphonate obtained from 1 - [bis(2-bromo-2-ethoxyethoxy)phosphinyl]cyclohexyl bis(2-bromo-2-ethoxyethyl) phosphite, Bis(2-fluoro-2-phenoxyethyl) phosphonate and bis(2-fluoro-2-phenoxyethyl) 1-cyclohexenylphosphonate obtained from 1 - [bis(2 - fluoro-2-phenoxyethoxy)phosphinyl]cyclohexyl bis( 2-fluoro-2-phenoxyethyl) phosphite, Bis(2-chloro-2-cyclohexylethyl) phosphonate and bis(2-chloro-2-cyclohexyl) 1-cyclohexenylphosphonate obtained from 1-[bis(2-chloro-2-cyclohexylethoxy)phosphinyl]cyclohexyl bis (2 - chloro-2-cyclohexylethyl) phosphite, Bis(2-chloro-4-hexynyl) phosphonate and bis(2-chloro-4-hexynyl) 1-cyclohexenylphosphonate obtained from 1[bis(2-chloro-4-hexynloxy)phosphinyl]cyclohexyl bis (2-chloro-4-hexynyl) phosphite, Bis(2-bromo-4-ethoxybutyl) phosphonate and bis(2-bromo-4-ethoxybutyl) 1-cyclohexenylphosphonate obtained from 1 - [bis(2-bromo-4-ethoxybutoxy)phosphinyl]cyclohexyl bis(2-bromo-4-ethoxybutyl) phosphite.

Illustrative examples of phosphonate products obtained when the phosphite-phosphonate ester has mixed negatively substituted radicals are:

2-chloroethyl 2-phenylethyl phosphonate and 2-chloroethyl 2 - phenylethyl 1 - cyclohexenylphosphonate obtained from 1 - [(2 - chloroethoxy)(2-phenylethoxy)-phosphinyl]cyclohexyl 2 - chloroethyl 2 - phenylethyl phosphite, 2-bromo-5-hexenyl 2-heptenyl phosphonate and 2-bromo-5-hexenyl 2-heptenyl 1-cyclohexenylphosphonate obtained from 1 - [(2 - bromo-5-hexenyloxy)(2-decenyloxy)phosphinyl]cyclohexyl 2-bromo-5-hexenyl 2-decenyl phosphite, 2-cyanoöctyl 2-chloro - 2 - phenylethyl phosphonate and 2-cyanoöctyl 2-chloro - 2 - phenylethyl 1-cyclohexenylphosphonate obtained from 1-[(2-cyanoöctyloxy)(2-chloro-2-phenylethoxy)phosphinyl]cyclohexyl 2-cyanoöctyl 2-chloro-2-phenylethyl phosphite, 2-bromo-3-chloropropyl 2-chloroethyl phosphonate and 2-bromo-3-chloropropyl 2-chloroethyl 1-cyclohexenylphosphonate obtained from 1-[(2-bromo-3-chloropropoxy)(2 - chloroethoxy)phosphinyl]cyclohexyl 2 - bromo-3-chloropropyl 2-chloroethyl phosphite, 2-chloroethyl 2-chloro-2-phenylethyl phosphonate and 2-cyanoethyl 2 - cyanopropyl 1 - cyclohexenylphosphonate obtained from 1-[(2-cyanoethoxy)(2-cyanopropoxy)phosphinyl]cyclohexyl 2-chloroethyl 2-chloro-2-phenylethyl phosphite, 2-bromo-2-pentenyl 2-bromobutyl phosphonate and bis-(2-chloroethyl) 1 - cyclohexenylphosphonate obtained from 1-[bis(2-chloroethoxy)phosphinyl]cyclohexyl 2-bromo-2-pentenyl 2-bromobutyl phosphite, Bis(2-bromoethyl) phosphonate and bis(2-chloroethyl) 1-cyclohexenylphosphonate obtained from 1 - [bis(2-chloroethoxy)phosphinyl]cyclohexyl bis(2 - bromoethyl) phosphite, Bis(2-chloro-3-butenyl) phosphonate and bis(2-chloro-2-phenylethyl) 1 - cyclohexenylphosphonate obtained from 1-[bis(2 - chloro - 2 - phenylethoxy)phosphinyl]-cyclohexyl bis(2-chloro-3-butenyl) phosphite, Bis(2-fluoroethyl) phosphonate and bis(2-cyanohexyl) 1-cyclohexenylphosphonate obtained from 1-[-bis(2-cyanohexyloxy)phosphinyl]cyclohexyl bis(2 - fluoroethyl) phosphite, Bis(2 - hexenyl) phosphonate and bis(2 - naphthylethyl) 1-cyclohexenylphosphonate obtained from 1 - [bis(2-naphthylethoxy)phosphinyl]cyclohexyl bis(2-hexenyl)-phosphite, and Bis(2-cyanoethyl) phosphonate and bis[2 - (2,4 - xylyl)-ethyl] 1 - cyclohexenylphosphonate obtained from 1-{bis - [2 - (2,4 - xylyl)ethoxy]phosphinyl}cyclohexyl bis(2-cyanoethyl) phosphite.

The presently provided phosphonate esters are stable, well defined compounds which range from viscous liquids to waxy or crystalline solids. They may be advantageously employed for a variety of industrial purposes but are particularly useful as pre-ignition inhibiting additives in leaded gasoline fuel compositions for internal combustion engines. Other applications in which the products of the present invention are useful are as oil and grease composition additives, particularly in extreme pressure lubricant compositions; as antioxidants; stabilizers; and as fire retardant additives for various polymer systems.

The compositions prepared by the process of this invention are particularly adaptable to use as pre-ignition inhibiting additives for leaded hydrocarbon fuels of the gasoline boiling range. The invention thus provides a novel gasoline additive composition containing the phosphonate esters described above, permissibly admixed with a halogenated organic material obtained as a by-product in the product of the process of this invention and also provides improved hydrocarbon fuel compositions for spark ignition internal combustion engines which comprises a hydrocarbon of gasoline boiling range, an organolead antiknock compound, a scavenging amount of an organic halide scavenger capable of reacting with lead during combustion to form volatile lead halide, and a mixture of compounds of the type

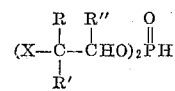

and

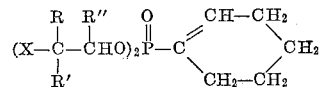

wherein R, R', R" and X are as defined above.

Pre-ignition is the ignition of the combustible mixture of air and fuel prior to firing by the sparkplug. This occurs when deposits of readily glowing material build up in the combustion chamber. When the fuel is a gasoline containing an organo-lead antiknock compound together with a halohydrocarbon scavenger, such readily glowing deposits comprise carbon in a mixture of lead halides, the latter acting to reduce the normal ignition temperature of carbon. Since reduction of the ignition temperature tends to increase with increasing concentration of the organo-lead antiknock compound, pre-ignition is a problem which becomes particularly troublesome as use of high compression engines become more prevalent. The deposits of carbon and lead salt retain sufficient heat from the previous firing cycle in sufficient quantity to permit them to glow, and if the glowing period (which depends upon ease of ignition, and hence the lead content of the deposit) is long enough, the fuel is fired in the next cycle before it can be fired by the spark plug. The erratic firing which thus results is demonstrated by a "wild ping" or dull thudding knock. It is generally accompanied by increased detonation, spark plug fouling, and reduction of exhaust valve life.

It has now been found that pre-ignition and the various difficulties consequent thereto can be substantially suppressed or entirely eliminated by incorporating into the leaded gasoline a pre-ignition inhibiting amount of the phosphonate ester containing composition produced by the process of this invention. The specific amount of the composition added will depend upon the quantity of organolead compound and halohydrocarbon scavenger in the fuel. Leaded gasolines usually contain an antiknocking quantity of an organolead compound such as tetraethyllead, tetramethyllead, dimethyldiethyllead, tetraphenyllead, and substantially the amount of hydrocarbon halide scavenger, say, ethylene dibromide, ethylene dichloride, acetylene tetrabromide, or mono- or polyhalopropane, butane or pentane, or polyhaloalkylbenzene, which is calculated to react with the organolead compound to give a lead halide, e.g., lead bromide when the organolead compound is tetraethyl lead and the halohydrocarbon is ethylene dibromide. The quantity of the presently provided phosphonate ester composition which will suppress pre-ignition of the leaded hydrocarbon fuel will depend upon the quantity of lead present in the fuel and will vary from, say, 0.05 to 10.0 moles of said ester per mole of lead present in said fuel.

As can be seen from what has been said above, a collateral advantage of using the composition provided by this invention in fuel compositions is that there is usually produced therewith a halohydrocarbon by-product which may be left in the phosphonate product composition to be used to replace some or all of the necessary halohydrocarbon scavenger usually added to leaded gasolines, thus making separation thereof unnecessary.

The objects, advantages, and embodiments of this invention are further illustrated by the following examples:

*Example 1*

To a 1435.5 g. portion of an equimolar mixture of bis-(2-chloroethyl) phosphorochloridite and tris(2-chloroethyl) phosphite, prepared by the reaction of 1634.4 g. (11.9 moles) of phosphorus trichloride with 1310 g. (29.75 moles) of ethylene oxide, there was added 294 g. (3.0 moles) of redistilled cyclohexanone over a period of 0.2 hour. The mixture was stirred and warmed moderately for 0.5 hour to complete the formation of the intermediate 1 - [bis(2 - chloroethoxy)phosphinyl]cyclohexyl bis(2-chloroethyl) phosphite.

When warming was continued at a higher temperature, an exothermic cleavage reaction was initiated at about 80° C. Cooling was used to keep the temperature at 85–90° C. until heat of reaction subsided. The mixture was warmed at 85–90° C. for 0.75 hour more to insure complete reaction and then concentrated to 135° C./0.05 mm. to give 307 g. of crude ethylene dichloride by-product and 1432 g. of colorless residue (I) which was shown by NMR studies to be substantially an equimolar mixture of bis(2-chloroethyl) phosphonate and bis(2-chloroethyl) 1-cyclohexenylphosphonate. Mixture (I) was soluble to the extent of 15–20% in a commercial grade gasoline.

Distillation of a 300 g. portion of mixture (I) gave 278.8 g. of a mixture (II), B.P. 120–182° C./0.1–0.6 mm. Fractionation of mixture (II) gave 117.3 g. of colorless liquid [largely bis(2-chloroethyl) phosphonate (III), B.P. 117–118° C./0.02 mm., $n_D^{25}$ 1.4737]; 26.0 g. of an intermediate cut; and 129.2 g. of bis(2-chloroethyl) 1-cyclohexenylphosphonate (IV), B.P. 156–157° C./0.06 mm., $n_D^{25}$ 1.4981. Product IV analyzed as follows:

|  | Found | Calc'd for $C_{10}H_{17}Cl_2O_3P$ |
| --- | --- | --- |
| Percent C | 41.39 | 42.0 |
| Percent H | 6.20 | 6.0 |
| Percent Cl | 24.92 | 24.7 |
| Percent P | 11.00 | 10.8 |

*Example 2*

To a reaction vessel containing 1100 g. (8.0 moles) of phosphorus trichloride and 8.25 g. (0.1 mole) of ethylene chlorohydrin cooled and stirred in a Dry Ice bath there was added 1138 g. (19.6 moles) of propylene oxide in 0.7 hour at 8–15° C. After removing a 4.5 g. sample of the reaction mixture, 432 g. (4.4 moles) of redistilled cyclohexanone was added as the mixture warmed to room temperature. After allowing the temperature of the mixture to rise spontaneously to 43° C., it was heated to 50° C. There was thus obtained bis(2-chloropropyl) [1-bis-(2-chloropropyl)phosphinyl]cyclohexyl phosphite. A 5.0 g. sample thereof was removed and the remainder was heated to about 110° C., at which point an exothermic reaction was noted. The temperature increased spontaneously to a rapid reflux at 143° C., and it was kept at reflux temperature for 0.2 hour after heat of reaction diminished. Distillation of the resulting reaction mixture gave 474 g. of 1,2-dichloropropane and 2146 g. of a colorless residue shown by nuclear magnetic resonance studies to be a substantially equimolar mixture of bis(2-chloropropyl) phosphonate and bis(2-chloropropyl) 1-cyclohexenylphosphonate. This mixture analyzed as follows:

|  | Found | Calc'd for $C_{18}H_{31}Cl_4O_6P_2$ |
| --- | --- | --- |
| Percent C | 39.57 | 39.3 |
| Percent H | 6.23 | 6.23 |
| Percent Cl | 25.15 | 25.75 |
| Percent P | 11.16 | 11.3 |

*Example 3*

To a mixture of 218.0 g. (0.81 mole) of tris(2-chloroethyl) phosphite and 83.4 g. (0.81 mole+3.9 g. excess) of distilled cyclohexanone there was added dropwise 182.4 g. (0.81 mole) of bis(2-chloroethyl) phosphorochloridite at 24–27° C. When the addition was completed the mixture was heated at 45–50° C. for 0.5 hour to form 1-[bis-(2-chloroethoxy)phosphinyl]cyclohexyl bis(2-chloroethyl) phosphite and then to 63° C. where an exothermic reaction took place, requiring cooling to keep the temperature below 75° C. When the reaction subsided, the mixture was heated at 65 to 70° C. to insure completion. Concentration of the reaction product to remove the 1,2-dichloroethane by-product gave as a colorless residue a substantially equimolar mixture of bis(2-chloroethyl) phosphonate and bis(2-chloroethyl) 1-cyclohexenyl phosphonate.

*Example 4*

This example illustrates that unless both the phosphorochloridite and phosphite starting materials are negatively substituted in the beta position, the desired cleavage reaction does not occur.

To a mixture of 83.1 g. (0.50 mole) of triethyl phosphite and 49.1 g. (0.54 mole) of cyclohexanone there was added 112.7 g. (0.50 mole) of bis(2-chloroethyl) phosphorochloridite at a rapid dropwise rate. When the addition was completed, the mixture was stirred and heated at about 55° C. for 1 hour and then cautiously heated to 130° C. and finally to 160° C./0.01 mm. with no indication of further reaction. There remained as residue 206.7 g. of product. The nuclear magnetic resonance chemical shifts for phosphorus were −137.2 p.p.m. and −23.5 p.p.m. relative to $H_3PO_4$ ($P^{31}$ resonance) which is consistant with the structure,

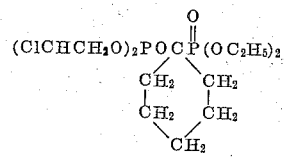

which is 1-(diethoxyphosphinyl)cyclohexyl bis(2-chloroethyl) phosphite, indicating that the desired cleavage did not occur to form products as claimed herein.

*Example 5*

To a reaction vessel containing 59.3 g. (0.432 mole) of phosphorus trichloride there was added dropwise 162.2 g. (1.08 moles) of glycidyl phenyl ether at 15–20° C. Then 21.2 g. (0.216 mole) of freshly distilled cyclohexanone was added. When the addition was completed the reaction mixture was heated to 64° C. for one hour to insure complete reaction to form 1-[bis(2-chloro-3-phenoxypropoxy)phosphinyl]cyclohexyl bis(2-chloro-3-phenoxypropyl) phosphite. The product was then heated at 132–134° C. for 1 hour to promote cleavage. Nuclear magnetic resonance studies showed that the product was a mixture of bis(2-chloro-3-phenoxypropyl) phosphonate and bis(2-chloro-3-phenoxypropyl) 1-cyclohexenylphosphonate.

*Example 6*

An equimolar mixture of tris(2-chloro-3-butenyl) phosphite and bis(2-chloro-3-butenyl) phosphorochloridite was prepared by reacting 92.0 g. (0.670 mole) of phosphorus trichloride with 11.4 g. (1.675 moles) of butadiene monoxide at 15–17° C., using 0.46 g. of ethylene chlorohydrin as a catalyst.

To this mixture there was added 32.8 g. (0.335 mole) of cyclohexanone at 23–27° C. The reaction mixture was heated at 50° C. for 1.75 hours to form 1-[bis(2-chloro-3-butenyloxy)phosphinyl]cyclohexyl bis(2-chloro-3-butenyl) phosphite and then warmed to 130° C. and finally concentrated to 130° C./0.1 mm. to give as residue 192.7 g. (96% of theory) of product. The nuclear magnetic resonance chemical shifts for phosphorous were −30.1 p.p.m., −20.8 p.p.m., and +15.3 p.p.m. relative to $H_3PO_4$ ($P^{31}$ resonance), which showed that the product was a mixture of bis(2-chloro-3-butenyl) phosphonate and bis-(2-chloro-3-butenyl) 1-cyclohexenylphosphonate.

*Example 7*

To an aquimolar mixture of bis(2-chloro-2-phenylethyl)phosphorochloridite and tris(2-chloro-2-phenylethyl) phosphite, prepared by reacting 68.6 g. (0.50 mole) of phosphorus trichloride with 150.1 g. (1.25 moles) of styrene oxide, there was added dropwise 24.5 g. (0.25 mole) of freshly distilled cyclohexanone at 23–27° C. The mixture was heated at 50–54° C. for 1 hour to form 1-[bis(2-chloro-2-phenylethoxy)phosphinyl]cyclohexyl bis(2-chloro-2-phenylethyl) phosphite, and then at 130° C. for 0.5 hour. Nuclear magnetic resonance analysis indicated chemical shifts for phosphorus at −30.6 p.p.m., −20.6 p.p.m., and +14.7 p.p.m. relative to phosphoric acid ($P^{31}$ resonance) which is in accordance with the two compounds, bis(2-chloro-2-phenylethyl) phosphonate and bis(2-chloro-2-phenylethyl) 1-cyclohexenylphosphonate.

*Example 8*

To a mixture of bis(2-bromo-3-chloropropyl)phosphorobromidite and tris(2-bromo-3-chloropropyl)phosphite, prepared by reaction of 125.1 g. (0.46 mole) of phosphorus tribromide with 106.8 g. (1.15 moles) of epichlorohydrin at 33–38° C. using 0.62 g. of ethylene chlorohydrin as catalyst, there was added 22.7 g. (0.231 mole) of cyclohexanone at 23–27° C. When the addition was completed, the mixture was warmed to 55° C. to promote the formation of 1-[bis(2-bromo-3-chloropropoxy)phosphinyl]cyclohexyl bis(2-bromo-3-chloropropyl)phospite. An exothermic reaction was observed which raised the temperature of the mixture to 90° C. The mixture was heated at 130° C. for 0.5 hour to insure complete reaction. Nuclear magnetic resonance chemical shifts for phosphorus were at −30.9 p.p.m., −20.8 p.p.m. and +15.7 p.p.m relative to $H_3PO_4$ ($P^{31}$ resonance) which are consistent with the structures of the desired products, bis(2-bromo-3-chloropropyl)phosphonate and bis(2-bromo-3-chloropropyl) 1-cyclohexenylphosphonate.

*Example 9*

To a mixture of 60.3 g. (0.25 mole) of tris(2-cyanoethyl)phosphite and 27.0 g. (0.28 mole) of cyclohexanone there was added 56.3 g. (0.25 mole) of bis(2-chloroethyl) phosphorochloridite at 24.5° C. to 36° C., using Dry Ice bath cooling. When the exothermic reaction had subsided the mixture was warmed at 55–60° C. for 1 hour to give 1-[bis(2-cyanoethoxy)phosphinyl]cyclohexyl bis(2-chloroethyl)phosphite, and then at 130–135° C. for 0.5 hour without further apparent exothermic reaction. Nuclear magnetic resonance chemical shifts for phosphorus at −31.7 p.p.m., −21.3 p.p.m., and +13.9 p.p.m. showed that the product was substantially a mixture of bis(2-chloroethyl) phosphonate and bis(2-cyanoethyl) 1-cyclohexenylphosphonate.

*Example 10*

To 565.1 g. of an equimolar mixture of bis(2-chloropropyl) phosphorochloridite and tris(2-chloropropyl) phosphite there was added all at once, 98.1 g. (1.0 mole) of cyclohexanone. The mixture was gently heated for 1.5 hour to give 1-[bis(2-chloropropoxy)phosphinyl]cyclohexyl bis(2-chloropropyl) phosphite and then finally to 140° C. to promote the cleavage reaction. The nuclear magnetic resonance chemical shifts for phosphorus were at −29.8 p.p.m., −21.1 p.p.m., and +16.7 p.p.m. relative to $H_3PO_4$ ($P^{31}$ resonance) which is in accordance with the two desired compounds, namely bis-(2-chloropropyl) phosphonate, and bis(2-chloropropyl 1-cyclohexenylphosphonate.

*Example 11*

This example illustrates the utility of the presently provided compounds as pre-ignition-inhibiting agents in a leaded hydrocarbon fuel. It has been established that there is a close relationship between the quantity of a material required to suppress glow and the effectiveness of the same material for reducing pre-ignition of a leaded fuel in gasoline engines; accordingly testing of the present compound was conducted by a glow test method wherein the following procedure was employed.

Test blends were prepared by blending 5 ml. of a fuel consisting of a high-boiling (380–420° F.) hydrocarbon fraction containing 27.21 mg. of lead per milliliter based on the quantity of commercial tetraethyllead-halohydrocarbon additive (hereinafter referred to as TEL) which had been incorporated therein and 1 ml. of an SAE 30 lubricating oil with (1) no glow prevention additive (control) or (2) a graduated precisely weighed quantity of the compound to be tested. Two milliliters of each test blend was then dropped at a constant rate (1.5±0.1 ml./15 minutes) during a 15–17 minute period, onto a reagent grade decolorizing carbon contained in a crucible maintained in a furnace at a temperature which was high enough to keep the bottom of the crucible at about 1000° F. By using test blends containing progressively lower quantities of the test compound, there was determined the minimum concentration of the test compound at which no glowing of the carbon was evidenced either during the dropping period of after all of the test sample had been added. Under these conditions, the "control" sample, i.e., the one which contained all of the constituents of the test blend except the glow preventive additive, caused the carbon to glow throughout addition thereof and after addition had been completed. On the other hand, no glow was observed when there was present in the test blend the minimum concentration of 0.0492 g. of bis(2-chloroethyl) 1-cyclohexenylphosphonate, as compared to the minimum concentration of 0.0656 g. of tricresyl phosphate, a standard commercial pre-ignition-inhibiting agent.

*Example 12*

Repeating the procedure of Example 11, but testing an approximately equimolar mixture of bis(2-chloroethyl) 1-cyclohexenylphosphonate and bis(2-chloroethyl) phosphonate, it was found that there was no glow observed when there was present in the test blend the minimum concentrations of 0.0433 g. of the above mixed phosphonates.

*Example 13*

By the same glow test method as described in Example 11, it was found that using the approximately equimolar mixture of bis(2-chloropropyl) 1-cyclohexenylphosphonate and bis(2-chloropropyl) phosphonate, prepared according to the process of this invention, no glow was observed when there was present in the test blend the minimum amount of 0.0600 g. of the mixture as compared to the minimum amount of 0.0656 g. of tricresyl phosphate in an identical test under the same conditions.

Reasonable variation and modification of the invention as described are possible, the essence of which is that there have been provided (1) two classes of phosphonate esters, (2) methods for simultaneously preparing both types of phosphonate esters, (3) pre-ignition-inhibiting compositions, and (4) improved hydrocarbon fuels containing the preignition-inhibiting compounds described herein.

We claim:

1. 1-[bis(2-cyanoethoxy)phosphinyl]cyclohexyl bis(2-chloroethyl) phosphite.

2. A process for preparing monophosphonates which comprises subjecting a compound of the formula

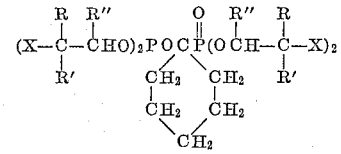

wherein X is an electronegative substituent selected from the group consisting of bromine, chlorine, fluorine, the cyano, and phenyl; R is selected from the group consisting of hydrogen, bromine, chlorine, fluorine, and hydrocarbyl having from 1 to 6 carbon atoms, hydrocarbyloxyalkyl radicals having from 1 to 6 carbon atoms, chlorine substituted hydrocarbyl having from 1 to 6 carbon atoms, bromine substituted hydrocarbyl having from 1 to 6 carbon atoms, chlorine substituted hydrocarbyloxyalkyl having from 1 to 6 carbon atoms, and bromine substituted hydrocarbyloxyalkyl having from 1 to 6 carbon atoms; R' is selected from the group consisting of hydrogen, bromine, chlorine, provided that when X is cyano, R is selected from the group consisting of hydrogen and alkyl having from 1 to 6 carbon atoms (and R' is hydrogen; R" is selected from the group consisting of hydrogen and methyl, to a thermal action of sufficient intensity on the order of from about 20° C. to about 150° C. to cleave said compound into said monophosphonates.

3. A process as described in claim 1 wherein X is cyano, and R, R' and R" are hydrogen.

4. A process according to claim 1 wherein the compound of the formula

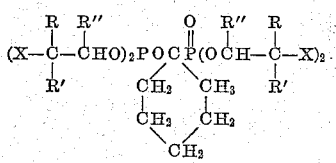

is prepared by reacting cyclohexanone with a phosphorohalidite of the formula

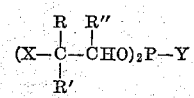

and a triorgano phosphite of the formula

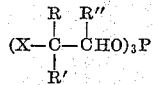

wherein X, R, R', and R" are as defined in claim 1 and Y is selected from the group consisting of bromine and chlorine.

5. A process which comprises heating a 1-[bis(2-chloroalkoxy)phosphinyl]cyclohexyl bis(2 - chloroalkyl)-phosphite having from 2 to 6 carbon atoms in each alkyl radical to from 55–150° C., for a time sufficient to cause cleavage thereof.

6. A process which comprises heating a 1-[bis(2-bromoalkoxy)phosphinyl]cyclohexyl bis(2-bromoalkyl) phosphite having from 2 to 6 carbon atoms in each alkyl group to from 55–150° C. for a time sufficient to cause cleavage thereof.

7. A process which comprises heating 1-[bis(2-chloropropoxy)phosphinyl]cyclohexyl bis(2 - chloropropyl) phosphite to from 55–150° C. for a time sufficient to effect a cleavage reaction.

8. A process which comprises heating 1-[bis(2-bromoethoxy)phosphinyl]cyclohexyl bis(2-bromoethyl) phosphite to from 55–150° C. for a time sufficient to effect a cleavage reaction.

9. A process which comprises heating 1-[bis(2-cyanoethoxy)phosphinyl]cyclohexyl bis(2-chloroethyl) phosphite to from 55–150° C. for a time sufficient to effect a cleavage reaction.

10. A process which comprises heating 1-[bis(2-chloro-2-butenyloxy)phosphinyl]cyclohexyl bis(2-chloro-2-butenyl) phosphite to from 55–150° C. for a time sufficient to effect a cleavage reaction.

11. A process which comprises heating 1-[bis(2-phenylethoxy)phosphinyl]cyclohexyl bis(2-phenylethyl) phosphite to from 55–150° C. for a time sufficient to effect a cleavage reaction.

12. A process which comprises heating 1-[bis(2-bromo-3 - chloropropoxy)phosphinyl]cyclohexyl bis(2-bromo-2-chloropropyl) phosphite to from 55–150° C. for a time sufficient to effect a cleavage reaction.

13. A process which comprises heating 1-[bis(2-chloro-3-phenoxypropoxy)phosphinyl]cyclohexyl bis(2-chloro-3-phenoxypropyl) phosphite to from 55° C. to 150° C. for a time sufficient to effect a cleavage reaction.

References Cited in the file of this patent

UNITED STATES PATENTS

| | | |
|---|---|---|
| 2,485,573 | Craig et al. | Oct. 25, 1949 |
| 2,683,168 | Jensen et al. | July 16, 1954 |
| 2,724,718 | Stiles et al. | Nov. 22, 1955 |
| 2,754,319 | Johnston et al. | July 10, 1956 |
| 2,807,636 | Buls et al. | Sept. 24, 1957 |
| 2,853,507 | Smith et al. | Sept. 23, 1958 |
| 2,934,507 | Chadwick et al. | Apr. 26, 1960 |
| 2,935,390 | Bartleson | May 3, 1960 |
| 2,948,600 | Larson | Aug. 9, 1960 |
| 2,957,904 | Stiles | Oct. 25, 1960 |

OTHER REFERENCES

Kosolapoff: "Organo-Phosphorus Compounds," John Wiley and Sons, New York (1950), p. 124.

Fay et al.: "J. Am. Chem. Soc.," vol. 74, Oct. 5, 1952, pp. 4933–4935.

McConnell et al.: "J. Am. Chem. Soc., vol. 78, pp. 4450–4452 (1956).